(12) United States Patent
Jeong et al.

(10) Patent No.: US 12,283,710 B2
(45) Date of Patent: Apr. 22, 2025

(54) BATTERY CELL INCLUDING GAS DISCHARGING PORTION

(71) Applicant: SK On Co., Ltd., Seoul (KR)

(72) Inventors: Taek Eon Jeong, Daejeon (KR); Sang Mo Kim, Daejeon (KR); Dong Ju Kim, Daejeon (KR); Jae Gyu Byun, Daejeon (KR); Sun Min Park, Daejeon (KR); Eun Soo Cho, Daejeon (KR)

(73) Assignee: SK ON CO., LTD., Seoul (KR)

(*) Notice: Subject to any disclaimer, the term of this patent is extended or adjusted under 35 U.S.C. 154(b) by 0 days.

(21) Appl. No.: 17/681,440

(22) Filed: Feb. 25, 2022

(65) Prior Publication Data
US 2022/0278416 A1    Sep. 1, 2022

(30) Foreign Application Priority Data

Feb. 26, 2021    (KR) .......................... 10-2021-0026126

(51) Int. Cl.
*H01M 50/333* (2021.01)

(52) U.S. Cl.
CPC ................................ *H01M 50/333* (2021.01)

(58) Field of Classification Search
CPC ........................................................ F16K 1/14
See application file for complete search history.

(56) References Cited

U.S. PATENT DOCUMENTS

| 2017/0271729 | A1* | 9/2017 | Hirsch |
| 2019/0219183 | A1* | 7/2019 | Hall-Snyder ......... F16K 15/148 |
| 2021/0341068 | A1* | 11/2021 | Sasaki ............... H01M 50/3425 |
| 2022/0216565 | A1* | 7/2022 | Sasaki |

FOREIGN PATENT DOCUMENTS

| DE | 102011054775 A1 * | 4/2013 | ............ H01M 10/48 |
| DE | 102019118182 A1 * | 1/2021 | |
| JP | 6653038 B1 | 2/2020 | |
| JP | 2020-063094 A | 4/2020 | |

OTHER PUBLICATIONS

SciDirect, Poppet Valve—an overview, updated 2023, SciDirect Topics (citing Andrew Parr MSc, Control Valves, 2011, Hydraulics and Pneumatics (Third Edition), Fig. 4.9) (Year: 2011).*
Bernad, Sandor & Resiga, Romeo. Numerical Model for Cavitational Flow in Hydraulic Poppet Valves (2012). Modelling and Simulation in Engineering. 2012. 1-10 (Year: 2012).*

* cited by examiner

*Primary Examiner* — Matthew T Martin
*Assistant Examiner* — Krishna R Hammond
(74) *Attorney, Agent, or Firm* — IP & T GROUP LLP (57) ABSTRACT

A battery cell includes: an electrode assembly; a battery case accommodating the electrode assembly and an electrolyte; and a gas discharging portion disposed between the electrode assembly and the battery case, and opening and closing a flow path based on pressure within the battery case, wherein the gas discharging portion includes: a moving member being moved in the flow path; a plurality of elastic members each elastically supporting the moving member; and a plurality of support members each disposed between the moving member and the elastic member, and in point contact with the moving member.

11 Claims, 7 Drawing Sheets

III-III'

BATTERY CELL INCLUDING GAS DISCHARGING PORTION

CROSS-REFERENCE TO RELATED APPLICATION(S)

This application claims benefit of priority to Korean Patent Application No. 10-2021-0026126 filed on Feb. 26, 2021 in the Korean Intellectual Property Office, the disclosure of which is incorporated herein by reference in its entirety.

BACKGROUND

1. Field

The present disclosure relates to a battery cell including a gas discharging portion.

2. Description of Related Art

A secondary battery, such as a battery cell, may be charged and discharged with electricity, unlike a primary battery, and may thus be applied to devices within various fields such as a digital camera, a mobile phone, a laptop computer and a hybrid vehicle. An example of the secondary battery may be a nickel-cadmium battery, a nickel-metal hydride battery, a nickel-hydrogen battery, a lithium secondary battery or the like.

In general, the secondary battery may be formed by stacking a cathode, a separator and an anode. In addition, materials of the battery may be selected in consideration of battery lifespan, charge/discharge capacity, temperature characteristic, stability and the like.

The secondary battery may be classified as a pouch-type battery, a can-type battery, or the like, based on a material of a case accommodating an electrode assembly. The pouch-type battery may accommodate the electrode assembly in a pouch formed of a soft polymer material having a non-uniform shape. Meanwhile, the can-type battery may accommodate the electrode assembly in a case formed of a material such as metal or plastic having a uniform shape.

The pouch-type battery cell may have a path to an external source which is completely closed in a final process of its production to prevent moisture or air from flowing into the pouch. This method may be very useful for long-term lifespan of the battery cell. However, this method may be a factor preventing discharge of a gas from occurring due to deterioration of the battery cell.

SUMMARY

An aspect of the present disclosure may provide a battery cell including a gas discharging portion which may effectively discharge a gas occurring in the battery cell.

According to an aspect of the present disclosure, a battery cell may include: an electrode assembly; a battery case accommodating the electrode assembly and an electrolyte; and a gas discharging portion disposed between the electrode assembly and the battery case, and opening and closing a flow path based on pressure within the battery case, wherein the gas discharging portion includes: a moving member being moved in the flow path; a plurality of elastic members respectively elastically supporting the moving member; and a plurality of support members respectively disposed between the moving member and the elastic member, and in point contact with the moving member.

The flow path may include: a second flow path on which the moving member, the plurality of elastic members and the plurality of support members are disposed; a first flow path connected to the second flow path, at least a portion of which is disposed in the battery case; and a third flow path connected to the second flow path, at least a portion of which is externally exposed from the battery case.

The moving member may be moved in the second flow path to open or close the connection between the first flow path and the second flow path.

The second flow path may be a rectangular parallelepiped space, and the moving member may have one surface in contact with the support member and having an elliptical shape.

The moving member may have a cross-sectional area reduced toward the first flow path.

The moving member may have the cross-sectional area smaller than a cross-sectional area of the second flow path and greater than respective cross-sectional areas of the first flow path and the third flow path.

The support member may have a spherical shape, and the elastic member may be a coil spring.

The support members may be distributed in four directions with respect to the one surface of the moving member.

The gas discharging portion may include: a body portion including the second flow path formed therein; a pipe-shaped inlet portion connected to one side of the body portion, and including the first flow path formed therein; and a discharging portion connected to the other side of the body portion, and including the third flow path formed therein.

The gas discharging portion may further include an extension portion extended from the body portion in a length direction of the body portion.

The extension portion may have a thickness lowering in a direction away from the body portion.

The extension portion may be bonded to the battery case.

The body portion may have the rectangular parallelepiped shape, and may have wide surfaces respectively bonded to the battery case.

The gas discharging portion may be coupled to the battery case.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

For example, in the present specification, terms "upper side," "upper portion," "lower side," "lower portion," "side surface" and the like, are described with reference to the drawings, and it is to be noted in advance that these terms may be described differently when their corresponding targets have changed directions.

Figure 1:
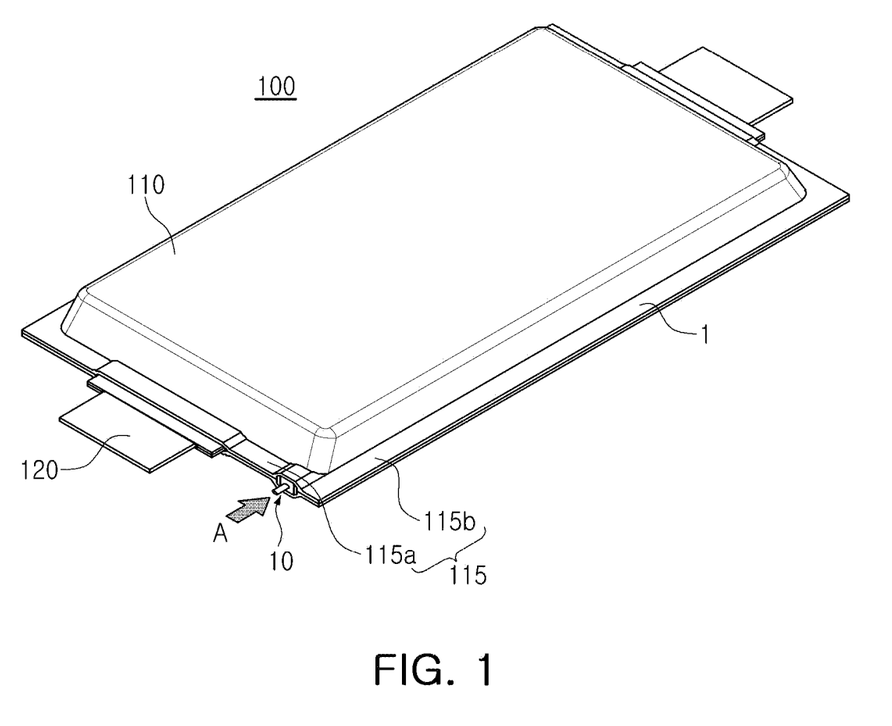
FIG. 1 is a perspective view schematically showing a pouch-type battery cell according to an exemplary embodiment of the present disclosure.
Figure 2:
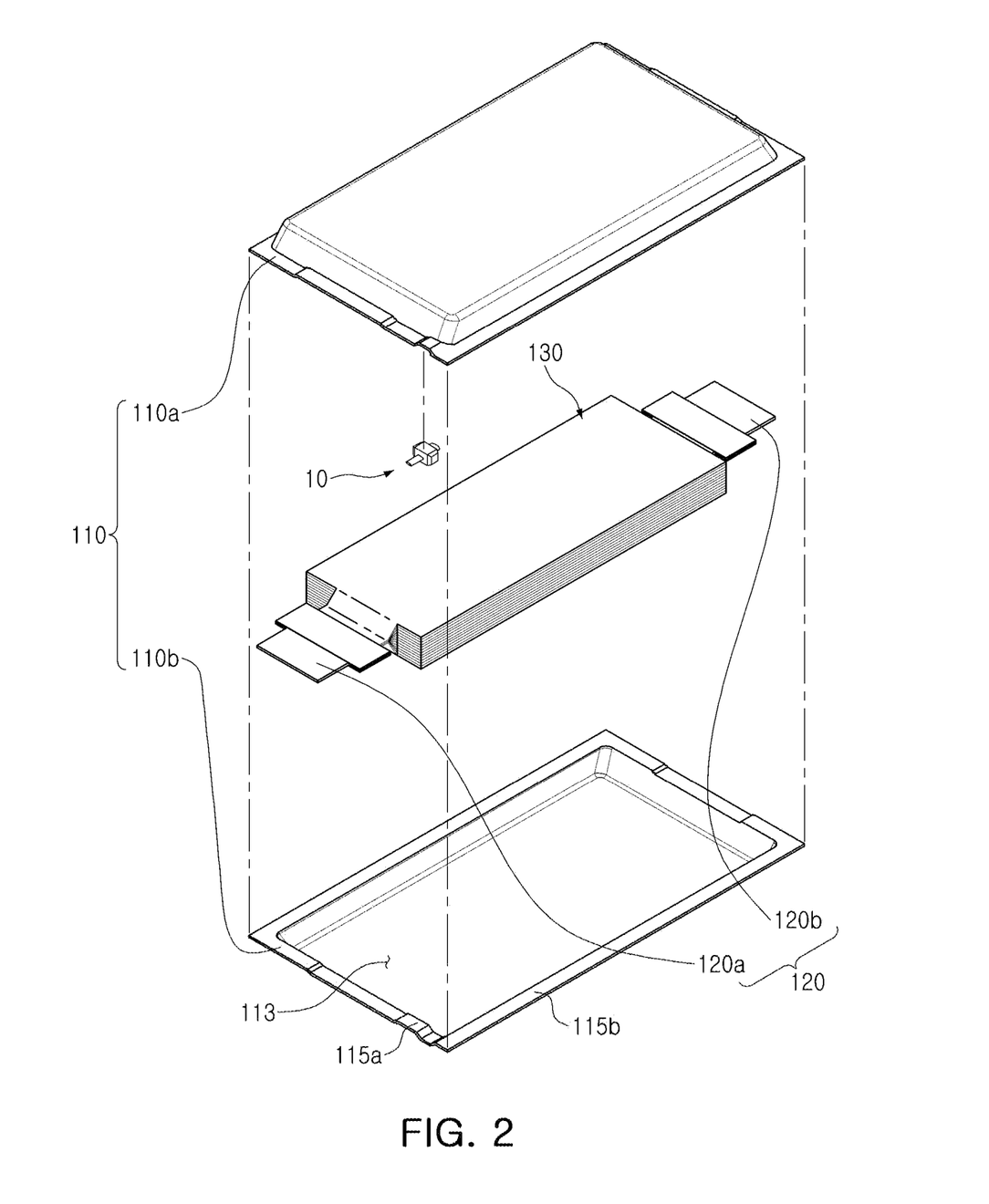
FIG. 2 is an exploded perspective view of the battery cell shown in FIG. 1.

FIG. 1 is a perspective view schematically showing a pouch-type battery cell according to an exemplary embodiment of the present disclosure; and FIG. 2 is an exploded perspective view of the battery cell shown in FIG. 1.

Referring to FIGS. 1 and 2, a battery cell 100 according to this exemplary embodiment may include an electrode assembly 130, a battery case 110 accommodating the electrode assembly and a gas discharging portion 10 coupled to the battery case 110.

The battery cell 100 according to this exemplary embodiment may be a rechargeable secondary battery, and include a lithium ion (i.e. Li-ion) battery or a nickel metal hydride (Ni—MH) battery. The nickel metal hydride battery may be a secondary battery using nickel for its positive electrode, a hydrogen storage alloy for its negative electrode, and an aqueous alkaline solution as its electrolyte, and have a large capacity per a unit volume. Therefore, the nickel metal hydride battery may be used not only as an energy source for an electric vehicle (EV) and a hybrid vehicle (HEV) but also used for various fields such as energy storage.

The battery cell 100 may have a pouch-type structure, and is not limited thereto. For example, the battery cell 100 may have a prismatic structure. This exemplary embodiment describes a case in which the battery cell 100 has the pouch-type structure as an example.

The battery case 110 may be used, for example, by performing an insulation treatment on a surface of a metal layer made of aluminum. The insulation treatment may be performed by applying modified polypropylene, which is a polymer resin, for example, casted polypropylene (CPP) on the surface of the metal layer to form a heat-sealing layer, and then forming a resin material such as nylon or polyethylene terephthalate (PET) on an outer surface thereof.

The battery case 110 may have an accommodation space 113 provided therein. The electrode assembly 130 may be accommodated in the accommodation space 113 in the battery case 110. In addition, an electrode lead 120 may externally protrude from the battery case 110.

The electrode assembly 130 may be accommodated together with the electrolyte in the accommodation space 113 in the battery case 110. The battery case 110 may be completed by coupling a lower case 110b and an upper case 110a, and then bonding edges of the lower case 110b and the upper case 110a in which the lower and upper cases are in contact with each other to seal the accommodation space 113. A thermal fusion method may be used to bonding the two edges to each other, and the present disclosure is not limited thereto. Hereinafter, the bonded edge is referred to as a sealing portion 115.

The sealing portion 115 may have a shape of a flange externally extended from the accommodation space 113, and thus be disposed along a periphery of the accommodation space 113.

In this exemplary embodiment, the sealing portion 115 may be divided into a first sealing portion 115a in which the electrode lead 120 is disposed and a second sealing portion 115b in which the electrode lead 120 is not disposed.

The electrode lead 120 may include a positive lead 120a and a negative lead 120b. The positive lead 120a and the negative lead 120b may protrude from both side surfaces of the battery case 110, and may respectively be connected to the electrode assembly 130.

The positive lead 120a and the negative lead 120b may respectively be formed of a thin plate-shaped metal. For example, the positive lead 120a may be made of aluminum (Al), and the negative lead 120b may be made of copper (Cu). However, the present disclosure is not limited thereto.

In this exemplary embodiment, the positive lead 120a and the negative lead 120b may be disposed in opposite directions. However, the present disclosure is not limited to this configuration and may be variously modified if necessary, and for example, the positive lead 120a and the negative lead 120b may be disposed in the same direction.

In addition, the battery cell 100 according to this exemplary embodiment may include at least one gas discharging portion 10.

The gas discharging portion 10 may be disposed between the electrode assembly 130 and the battery case 110. For example, the gas discharging portion 10 may be coupled to the sealing portion 115 of the battery case 110, at least a portion of the gas discharging portion 10 may be disposed in the accommodation space 113 in the battery case 110, and at least a portion of the gas discharging portion 10 may be externally exposed from the battery case 110.

Figure 3:
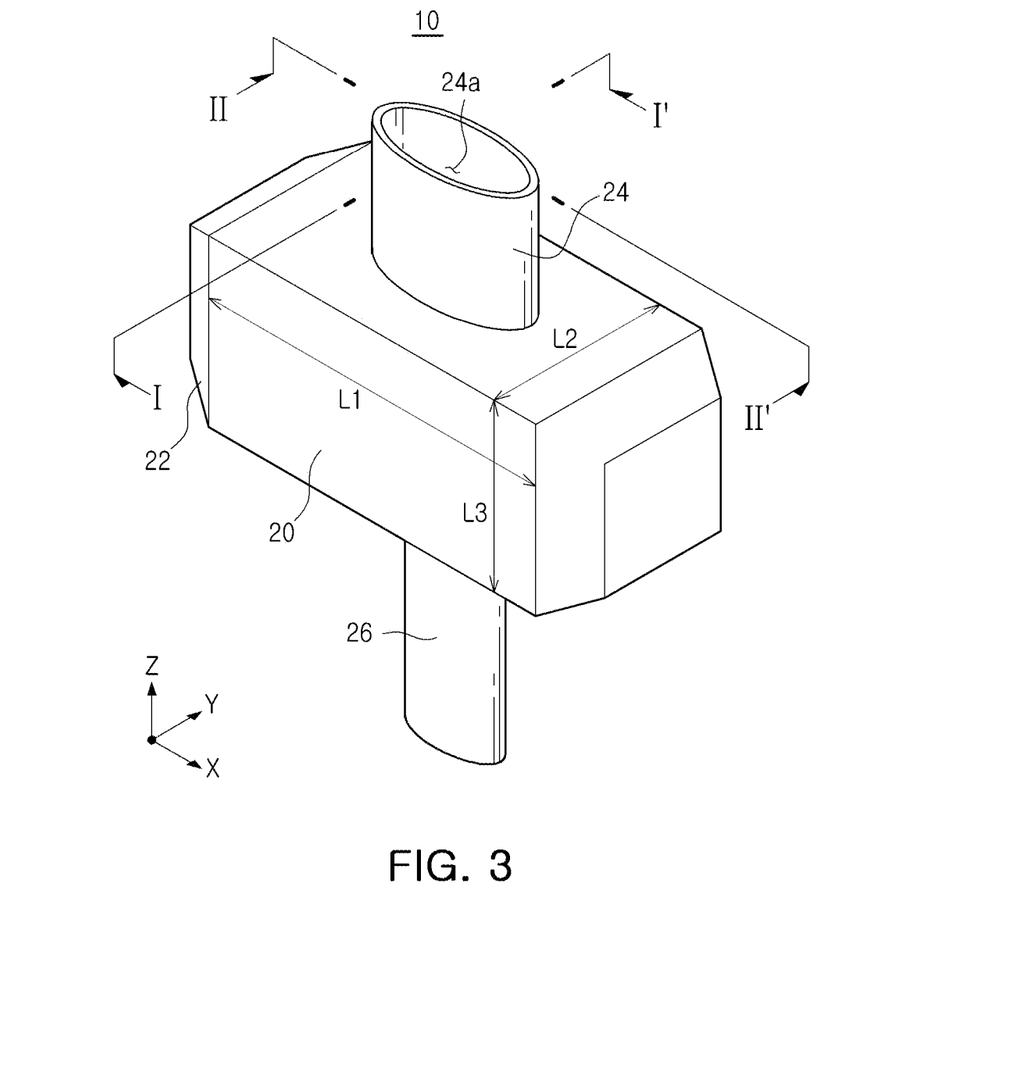
FIG. 3 is a perspective view of a gas discharging portion shown in FIG. 2.
Figure 4:
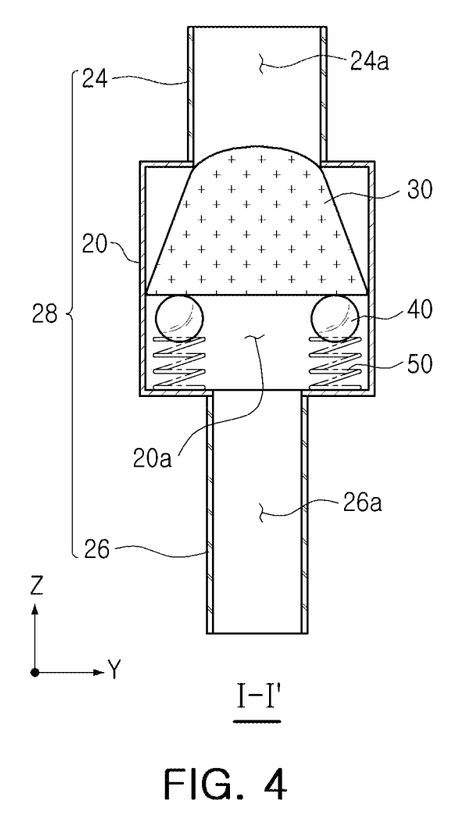
FIG. 4 is a cross-sectional view taken along line I-I' of the gas discharging portion shown in FIG. 3.
Figure 5:
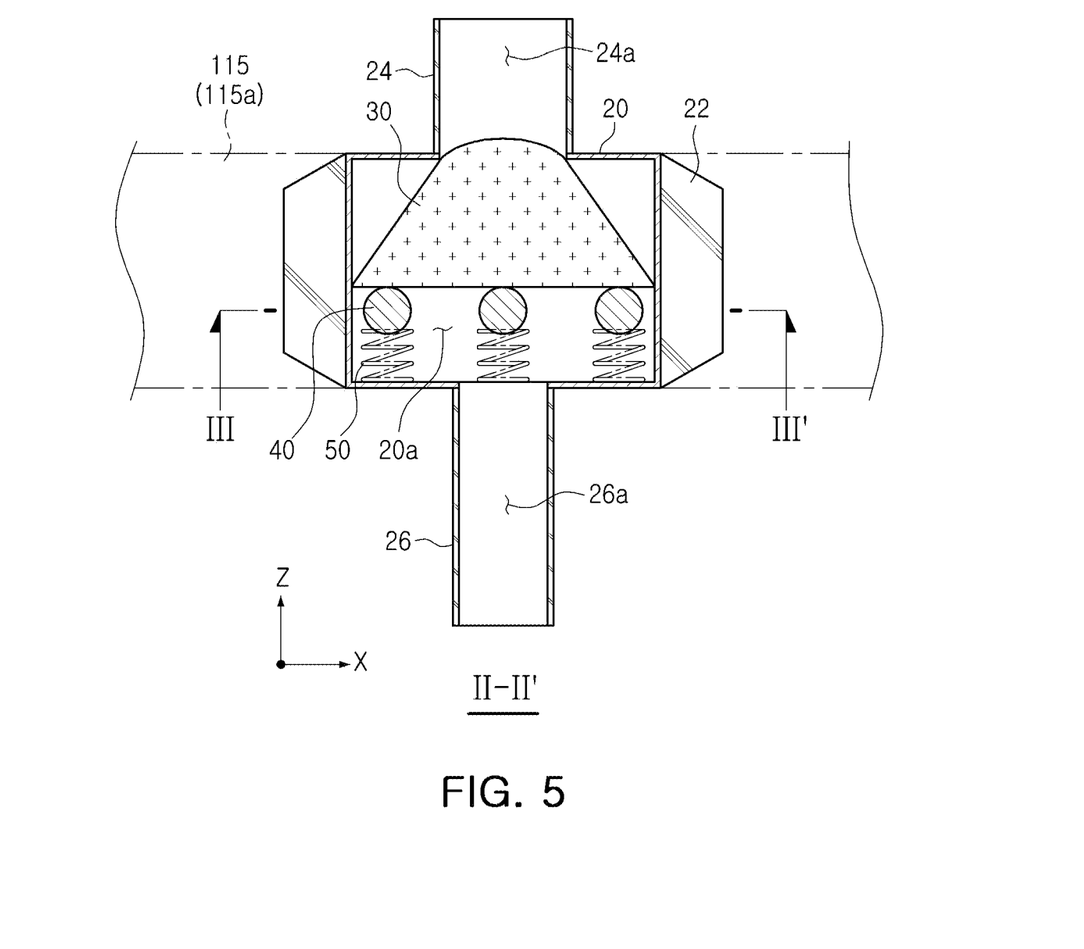
FIG. 5 is a cross-sectional view taken along line II-II' of FIG. 3.
Figure 6:
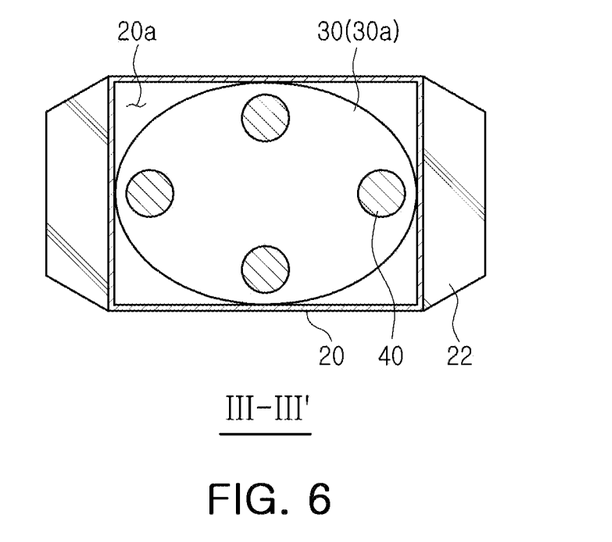
FIG. 6 is a cross-sectional view taken along line III-III' of FIG. 5.

FIG. 3 is a perspective view of the gas discharging portion shown in FIG. 2; FIG. 4 is a cross-sectional view taken along line I-I' of the gas discharging portion shown in FIG. 3; FIG. 5 is a cross-sectional view taken along line II-II' of FIG. 3; and FIG. 6 is a cross-sectional view taken along line of FIG. 5.

Referring to FIGS. 3 through 6 together, the gas discharging portion 10 according to this exemplary embodiment may include a housing 28 fixedly coupled to the sealing portion 115, a moving member 30 disposed in the housing 28, a support member 40 and an elastic member 50.

The housing 28 may form an overall appearance of the gas discharging portion 10. The housing 28 may be made of an insulating material such as a resin or a metal material, and may include a flow path having both ends open.

The flow path in the housing 28 may remain closed by the moving member 30 described below, and may be opened as the moving member 30 is moved.

At least a portion of the housing 28 may be interposed between the sealing portions 115 to be bonded to the battery case 110. In addition, the housing 28 may include one end externally exposed from the battery case 110 and the other end disposed in the accommodation space 113 in the battery case 110.

In more detail, the housing 28 may include a body portion 20 interposed between the sealing portions 115, an inlet portion 24 externally exposed from the battery case 110, and a discharging portion 26 disposed in the space in the battery case.

In addition, the flow path formed in the housing 28 may be used as a space through which the gas is moved when the gas is discharged, and may include a first flow path 24a, a second flow path 20a and a third flow path 26a.

The first flow path 24a, the second flow path 20a and the third flow path 26a may all have a pipe shape, and may be disposed on a straight line.

In addition, the housing 28 may include the body portion 20 including the second flow path 20a formed therein, an extension portion 22 extended from the body portion 20 in a wing shape, an inlet portion 24 including the first flow path 24a formed therein and a discharging portion 26 including the third flow path 26a formed therein.

The body portion 20 may be a portion having a largest volume, and the moving member 30, the support member 40 and the elastic member 50 may be disposed in the second flow path 20a positioned in the body portion 20.

The body portion 20 may have a length (hereinafter, first length L1) in an X-axis direction greater than a length (hereinafter, second length L2) in a Y-axis direction with reference to FIG. 3. Here, the first length L1 may indicate a length of the body portion 20 in a length direction of the sealing portion 115 to which the gas discharging portion 10 is bonded, and the second length L2 may indicate a thickness of the body portion 20, i.e. a distance between the sealing portions 115 bonded to both surfaces of the body portion 20.

Accordingly, the body portion 20 in this exemplary embodiment may have a rectangular parallelepiped shape rather than a regular hexahedron shape, and may have wide surfaces of the rectangular parallelepiped, respectively bonded to the sealing portions 115, thus being coupled to the battery case 110. Accordingly, the second flow path 20a, which is the space in the body portion 20, may also have the shape of the rectangular parallelepiped.

As shown in FIG. 2, in the gas discharging portion 10 in this exemplary embodiment, a bonding area in which the gas discharging portion is in contact with the sealing portion 115 may be increased as the first length L1 is increased, thereby increasing bonding reliability thereof. However, a distance between the sealing portions 115 may be increased when the second length L2 is increased, and it may thus be difficult to firmly bond the sealing portion 115 and the gas discharging portion 10 to each other.

Therefore, the gas discharging portion 10 in this exemplary embodiment may have the first length L1 longer than the second length L2. In addition, corresponding to the shape of the body portion 20, the second flow path 20a positioned in the body portion 20 may also have a length in a direction of the first length L1 greater than a length in a direction of a second length L2.

Meanwhile, a length (hereinafter, third length L3) of the body portion 20 in a Z-axis direction may indicate a length of the body portion 20 between the inlet portion 24 and the discharging portion 26, which are described below, and may be the same as or similar to a width of the sealing portion 115.

The body portion 20 in this exemplary embodiment may have the first length L1 that is twice or more than the second length L2. In addition, the second length L2 and the third length L3 may be the same or similar to each other. For example, the body portion 20 in this exemplary embodiment may have the first length L1 of 10 to 100 mm, the second length L2 of 5 to 20 mm, and the third length L3 of 5 to 20 mm. However, the present disclosure is not limited thereto.

The extension portion 22 may externally protrude from either side of the body portion 20 of the housing 28, and may have a thickness lowering in a direction away from the body portion 20 of the housing 28. The extension portion 22 may be bonded to the sealing portion 115 of the battery case 110. The extension portion 22 in this exemplary embodiment may thus be extended from the body portion 20 in the length direction of the body portion 20, and may be expanded to increase an area in which the extension portion 22 and the sealing portion 115 are bonded to each other. As described above, the gas discharging portion 10 in this exemplary embodiment may include the extension portion 22, and may thus expand the area in which the gas discharging portion and the sealing portion 115 are bonded to each other, thereby improving the bonding reliability between the sealing portion 115 and the gas discharging portion 10.

The body portion 20 in this exemplary embodiment may be made of the same material as the battery case 110. In more detail, the body portion 20 may be made of the same material as a material of a portion of the battery case 110, bonded to the body portion 20. However, the present disclosure is not limited thereto.

In addition, the body portion 20 in this exemplary embodiment may be attached to the sealing portion 115 by using a polymer film. For example, the gas discharging portion 10 may be coupled to the battery case 110 by including both the side surfaces of the body portion 20 may respectively be bonded to the sealing portion 115 of the lower case 110b and the sealing portion 115 of the upper case 110a by using the polypropylene film, thereby allowing the gas discharging portion 10 to be coupled to the battery case 110. However, a configuration of the present disclosure is not limited thereto.

The flow path formed in the housing 28 may be used as the space through which the gas is moved when the gas is discharged, and may include the first flow path 24a, the second flow path 20a and the third flow path 26a.

The first flow path 24a, the second flow path 20a and the third flow path 26a may all have the pipe shape, and may be disposed on a straight line.

The first flow path 24a may be used as a path through which the gas in the battery cell 100 flows, and at least a portion of first flow path 24a may be disposed in the space in the battery cell 100.

In more detail, the first flow path 24a may be connected to one side of the body portion 20 and may be formed in the inlet portion 24. In addition, the third flow path 26a may be used as a path through which the gas flowing into the second flow path 20a may be externally discharged from the battery cell 100, and at least a portion of the third flow path 26a may be externally disposed from the battery cell 100. For example, the third flow path 26a may be formed in the discharging portion 26 connected to the other side of the body portion 20.

The second flow path 20a in this exemplary embodiment may be disposed between the first flow path 24a and the third flow path 26a, and may be made larger than the first flow path 24a or the third flow path 26a. The second flow path 20a may thus have a larger cross-sectional area than the first flow path 24a or the third flow path 26a. A step may thus respectively be formed in a portion in which the first flow path 24a is connected to the second flow path 20a and a portion in which the third flow path 26a is connected to the second flow path 20a.

However, the present disclosure is not limited thereto, and may allow the flow paths to have a reverse configuration or the same cross-sectional area. In this case, a protrusion-shaped jaw may be formed at each boundary between the first flow path 24a, the second flow path 20a and the third flow path 26a.

The moving member 30, the support member 40 and the elastic member 50 may be disposed in the second flow path 20a.

Figure 7:
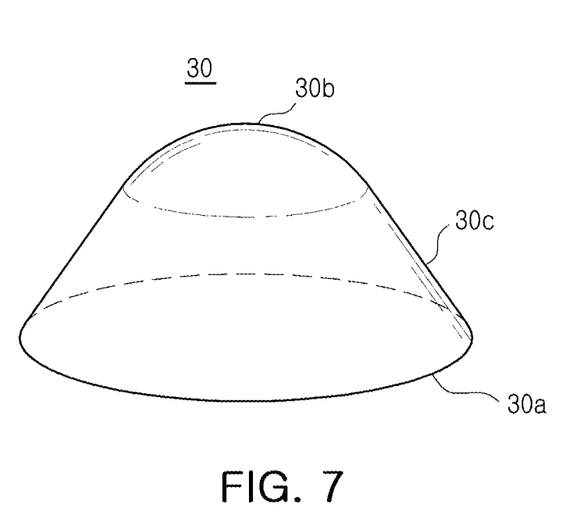
FIG. 7 is a perspective view of a moving member shown in FIG. 5.

FIG. 7 is a perspective view of the moving member shown in FIG. 5, and referring to this drawing together, the moving member 30 in this exemplary embodiment may be moved in the second flow path 20a in a length direction of the flow path. Therefore, with reference to FIG. 4, the moving member 30 may have a height smaller than a length (in a direction of L3) of the second flow path 20a.

The moving member 30 in this exemplary embodiment may have a cross-sectional area increased toward the third flow path 26a (hereinafter, lower surface). Accordingly, the moving member 30 may include a lower surface 30a having a largest area and an upper surface having the smallest area.

To this end, a side surface 30c of the moving member 30 may be an inclined surface. However, the present disclosure is not limited thereto, and the side surface of the moving member may be variously modified, as necessary. For example, the side surface of the moving member 30 may include continuous steps such as stairs. Alternatively, the side surface of the moving member 30 may be a concave or convex curved surface.

As described above, the body portion 20 may have the first length L1 longer than the second and third lengths L2 and L3. The moving member 30 disposed in the second flow path 20a may thus also have a length in the direction of the first length L1, which is longer than a length in another direction.

In addition, as shown in FIG. 6, the moving member 30 in this exemplary embodiment may include the lower surface 30a having an elliptical shape. The second flow path 20a in this exemplary embodiment may be the rectangular parallelepiped space, and the moving member 30 may thus be disposed in such a manner that a partial lower surface 30a rather than the entire lower surface 30a may be in a contact with an inner surface of the body portion 20. Therefore, the second flow path 20a in this exemplary embodiment may be not completely closed by the moving member 30.

The moving member 30 may have a cross-sectional area smaller than the cross-sectional area of the second flow path 20a and greater than the cross-sectional area of the first flow path 24a. In addition, an upper surface of the moving member 30 may be a curved surface convexly externally protruding, and at least a portion of the protruding portion may be inserted into the first flow path 24a.

At least a portion of the moving member 30 may be disposed at a point at which the first flow path 24a and the second flow path 20a meet, and the moving member 30 may be moved in the second flow path 20a to open or close the connection of the first flow path 24a and the second flow path 20a.

To this end, an upper end 30b of the moving member 30 may be in close contact with the first flow path 24a to completely close the first flow path 24a. In addition, the upper end 30b of the moving member 30 may have a shape in which the upper end 30b firmly closes the first flow path 24a from the second flow path 20a.

As described above, the moving member 30 in this exemplary embodiment may have the cross-sectional area reduced toward the first flow path 24a. Therefore, when the moving member 30 completely closes the first flow path 24a, the upper end of the moving member 30 may be partially inserted into the first flow path 24a as shown in FIG. 4.

The first flow path 24a in this exemplary embodiment may have an elliptical cross-section. Accordingly, the moving member 30 may also have an elliptical cross-section of a portion in contact with the first flow path 24a.

However, the moving member 30 is not limited to this shape, and may have any of various shapes as long as the moving member 30 easily closes the first flow path 24a.

The support member 40 may be disposed on the lower surface 30a of the moving member 30. To this end, the lower surface 30a of the moving member 30 may be a flat surface. However, the lower surface 30a is not limited to this shape, and may be variously modified if necessary, and for example, a groove into which the support member 40 is partially inserted may be formed in the lower surface 30a of the moving member 30.

The support member 40 may have a spherical shape such as a ball, and may each be disposed between the moving member 30 and the elastic member 50 described below to support the moving member 30.

The plurality of the support members 40 may be distributed and entirely support the lower surface 30a of the moving member 30. Accordingly, a force applied to the moving member 30 by a pressure of the gas while the gas in the battery cell 100 is discharged may be distributed to the plurality of support members 40.

As shown in FIG. 5, this exemplary embodiment may provide four support members 40, and the support members may each be in contact with a portion of the lower surface 30a of the moving member 30, which is in contact with the body portion 20 or disposed closest to the body portion 20. For example, the support members 40 may be arranged in four directions with respect to the lower surface 30a of the moving member 30 to stably support the lower surface 30a. However, the present disclosure is not limited thereto, and may include more or fewer support members 40 if necessary.

The elastic member 50 may be disposed between the support member 40 and the body portion 20 to elastically support the support member 40.

The elastic member 50 may have one end supported on a step formed at a point at which the second flow path 20a and the third flow path 26a meet, and the other end supporting the support member 40. Accordingly, the elastic member 50 may have an outer diameter equal to or smaller than a diameter of the support member 40.

The elastic member 50 may be a coil spring. However, the elastic member 50 is not limited thereto, and may use any of various types of elastic bodies as long as the support member 40 is elastically supported.

As described above, the gas discharging portion 10 in this exemplary embodiment may include the plurality of support members 40. Accordingly, the plurality of elastic members 50 may be provided to elastically support each of the support members 40.

Hereinafter, the description describes an operation of the gas discharging portion 10.

Figure 8:
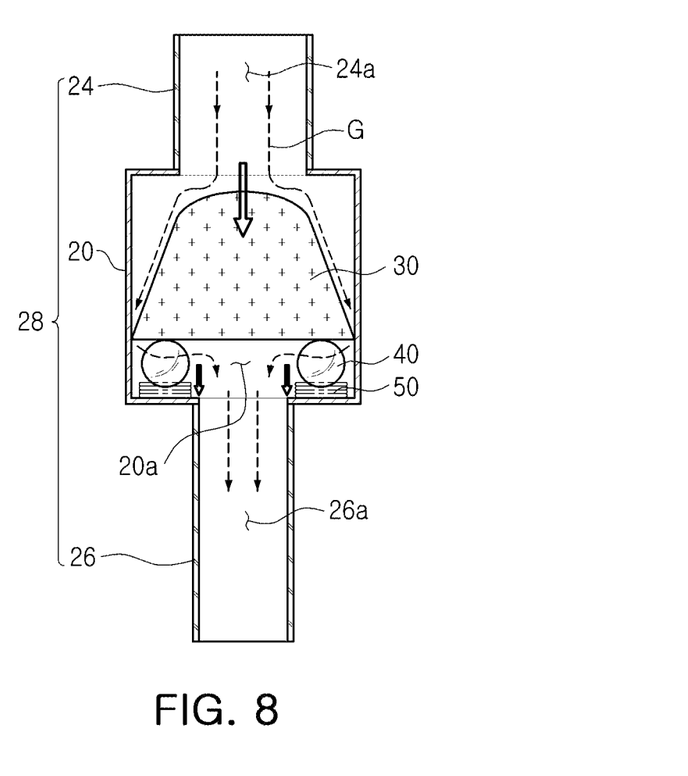
FIG. 8 is a cross-sectional view showing an operation of the gas discharging portion shown in FIG. 4.

FIG. 8 is a cross-sectional view showing the operation of the gas discharging portion shown in FIG. 4.

When the battery cell 100 or a battery module in which the plurality of battery cells are connected to each other is normally operated, the moving member 30 may be in close contact with the first flow path 24a as shown in FIG. 4 by an elastic force of the elastic member 50, and the first flow path 24a and the second flow path 20a may thus be maintained to be closed from each other by the moving member 30.

The elastic member 50 may then be compressed by the pressure of the gas when an abnormality occurs in the battery cell 100 or the battery module to cause gas in the battery cell, thereby making the pressure of the gas greater than the elastic force of the elastic member 50. In this process, the moving member 30 may be moved toward the third flow path 26a by the pressure of the gas to be spaced apart from the first flow path 24a, and the first flow path 24a and the second flow path (20a) may be connected to each other as shown in FIG. 8.

As the first flow path 24a and the second flow path 20a are connected to each other, gas G occurring in the battery cell 100 may be transferred to the first flow path 24a, the second flow path 20a and the third flow path 26a to be externally discharged from the battery cell 100.

Meanwhile, the elastic member 50 may be stretched again when pressure within the battery cell 100 is less than the elastic force of the elastic member 50 because the gas is discharged. In this process, the moving member 30 may be moved again toward the first flow path 24a to be inserted into the first flow path 24a, and the first flow path 24a and the second flow path 20a may thus be closed from each other again.

The gas discharging portion 10 configured as described above in this exemplary embodiment may have the plurality of support members 40 and the plurality of elastic members 50, elastically supporting the moving member 30. Accordingly, when the moving member 30 is moved by the increased pressure in the battery cell 100, the force applied to the moving member 30 may be evenly distributed to the plurality of support members 40.

Accordingly, the moving member 30 may be moved only in the length direction (Z-axis direction) of the flowpath without unnecessary shake or flow during movement thereof, and the gas discharging portion 10 may thus be stably operated in a process of discharging the gas.

Unlike this exemplary embodiment, when the moving member 30 is in direct contact with the elastic member 50, that is, when the moving member 30 is in surface contact or line contact with the elastic member 50, a portion may be wide in which the moving member 30 and the elastic member 50, and thus have a lifted portion at which the moving member 30 and the elastic member 50 fail to be in even contact with each other. In this case, the moving member 30 may be moved while being shaken or twisted.

However, in this exemplary embodiment, a force transmitted from the moving member 30 to the elastic member 50 may be transmitted through the support member 40, and the support members 40 may respectively have the spherical shape and be in point contact with the moving member 30. In this manner, it is possible to prevent the contact point between the moving member 30 and the support member 40 from being lifted, thus elastically supporting the moving member 30 more stably.

Therefore, according to an exemplary embodiment of the present disclosure, the gas discharging portion may be stably operated in the process of discharging the gas.

While the exemplary embodiments have been shown and described above, it will be apparent to those skilled in the art that modifications and variations could be made without departing from the scope of the present disclosure as defined by the appended claims.

For example, a coating layer having excellent corrosion resistance may be formed on an inner wall of each flow path or each surface of the support member, the moving member and the elastic member which are disposed in the flow path. The coating layer may be made of a titanium (Ti) material, and is not limited thereto.

In addition, each of the embodiments may be implemented in combination with each of others thereof.

What is claimed is:

1. A battery cell comprising:
an electrode assembly;
a battery case accommodating the electrode assembly and an electrolyte; and
a gas discharging portion disposed between the electrode assembly and the battery case, and opening and closing a flow path based on pressure within the battery case,
wherein the battery case is a flexible pouch type, and has a sealing portion formed by sealing at least a portion of edges of the battery case,
wherein the gas discharging portion includes:
a body portion fixedly coupled to and positioned in the sealing portion;
a moving member being moved in the flow path;
a plurality of elastic members respectively elastically supporting the moving member; and
a plurality of support members respectively disposed between the moving member and the elastic member, not closing the flow path and in point contact with the moving member to prevent a contact point between the moving member and the support member from being lifted,
wherein the body portion has a rectangular parallelepiped shape, and has wide surfaces of the rectangular parallelepiped respectively bonded to the sealing portions,
wherein the moving member, the plurality of elastic members, and the plurality of support members are disposed in the rectangular parallelepiped space of the body portion,
wherein the body portion has a shape in which a length in a first direction is longer than a length in a second direction,
wherein the first direction is a length direction of the sealing portion,
wherein the second direction is a thickness direction of the sealing portion,
wherein the moving member has one surface in contact with the plurality of support members and having an elliptical shape, and
wherein the plurality of support members are distributed in a plurality of directions with respect to the one surface of the moving member to support the moving member in balance.

2. The battery cell of claim 1, wherein the flow path includes:
a second flow path on which the moving member, the plurality of elastic members and the plurality of support members are disposed;
a first flow path connected to the second flow path, at least a portion of which is disposed in the battery case; and
a third flow path connected to the second flow path, at least a portion of which is externally exposed from the battery case.

3. The battery cell of claim 2, wherein the moving member is moved in the second flow path to open or close the connection between the first flow path and the second flow path.

4. The battery cell of claim 3, wherein the second flow path is the rectangular parallelepiped space.

5. The battery cell of claim 4, wherein the moving member has a cross-sectional area reduced toward the first flow path.

6. The battery cell of claim 2, wherein the moving member has the cross-sectional area smaller than a cross-sectional area of the second flow path and greater than respective cross-sectional areas of the first flow path and the third flow path.

7. The battery cell of claim 4, wherein the support member has a spherical shape, and the elastic member is a coil spring.

8. The battery cell of claim 2,
wherein the body portion includes the second flow path formed therein;
wherein the gas discharging portion further includes:
a pipe-shaped inlet portion connected to one side of the body portion, and including the first flow path formed therein; and
a discharging portion connected to the other side of the body portion, and including the third flow path formed therein.

9. The battery cell of claim 8, wherein the gas discharging portion further includes an extension portion extended from the body portion in the first direction of the body portion.

10. The battery cell of claim 9, wherein the extension portion has a thickness lowering in a direction away from the body portion.

11. The battery cell of claim 10, wherein the extension portion is bonded to the battery case.

\* \* \* \* \*